Nov. 3, 1964  G. M. BELL  3,155,894
VOLTAGE STABILIZING SYSTEMS
Filed March 2, 1961  4 Sheets-Sheet 1

Inventor:
Gordon M. Bell,
by Henry J. Marinich
Attorney.

Inventor:
Gordon M. Bell,
by Henry J. Marcinish
Attorney.

Nov. 3, 1964        G. M. BELL            3,155,894
                VOLTAGE STABILIZING SYSTEMS
Filed March 2, 1961                    4 Sheets-Sheet 3

Inventor:
Gordon M. Bell,
by Henry J. Marcinski
Attorney.

Nov. 3, 1964 G. M. BELL 3,155,894
VOLTAGE STABILIZING SYSTEMS
Filed March 2, 1961 4 Sheets-Sheet 4

Fig. 7.

Inventor:
Gordon M. Bell,
by Henry J. Marciniak
Attorney.

United States Patent Office 3,155,894
Patented Nov. 3, 1964

3,155,894
VOLTAGE STABILIZING SYSTEMS
Gordon M. Bell, Fort Wayne, Ind., assignor to General Electric Company, a corporation of New York
Filed Mar. 2, 1961, Ser. No. 92,820
17 Claims. (Cl. 323—66)

This invention relates to alternating current voltage stabilizing systems which provide a substantially constant alternating current output voltage at a predetermined stabilized level and more particularly to voltage stabilizing systems employing high reactance transformers and maintaining a substantially constant output voltage over a wide range of variations in the input frequency, load changes, and input voltage.

Voltage stabilizing systems of the prior art utilizing a high reactance transformer and a capacitor connected across the transformer secondary or a part thereof have provided satisfactory voltage stabilizing action for variations in the input voltage, but provide no stabilizing action for variations in the input frequency or for wide load changes. Voltage stabilizing systems of this type function as a nonlinear type of ferroresonant circuit comprised of the capacitor and the secondary winding or portion thereof connected in parallel with the capacitor. The capacitor draws a leading current from the secondary winding and thereby causes the core of the high reactance transformer to operate in the saturated region or in effect, as a saturable reactor having a fixed volt-second capacity. As long as the volt-second capacity of the secondary winding remains fixed, the output voltage will not be affected by variations in the input voltage since the output voltage is essentially a function of the frequency, the saturation flux density, reactor turns and effective area of the core. Such voltage stabilizing systems of the prior art compensate only for changes in the input voltage and do not compensate for other factors which will cause the output voltage to deviate from its stabilized level, such as changes in the supply frequency and load.

There are certain applications for voltage stabilizing systems in which it is highly desirable that a constant output voltage be maintained irrespective of changes in input frequency and load. Further, it is desirable to provide a voltage stabilizing system wherein the electrical components are efficiently utilized and copper and core losses are effectively minimized.

Accordingly, a primary object of the present invention is to provide an improved voltage stabilizing system incorporating the foregoing advantages and features.

A more specific object of the present invention is to provide a voltage stabilizing system which automatically compensates for deviations in the output voltage from a predetermined stabilized level irrespective of cause.

It is another object of the invention to provide an improved voltage stabilizing system in which the output voltage is maintained constant regardless of variations in the frequency of the alternating supply current.

A further object of the invention is to provide an improved voltage stabilizing system wherein the output voltage is maintained substantially constant irrespective of changes in the load.

According to the invention I have provided a voltage stabilizing system employing a high reactance transformer wherein a full wave self-saturating saturable reactor is connected across at least a portion of the secondary winding of the transformer. A capacitor is connected across the secondary winding so as to cause a leading current to flow therethrough and to serve as a storage element for electrical energy. A control circuit is provided to apply a magnetomotive force to the self-saturating saturable reactor that compensates for deviations in the output voltage from a predetermined stabilized level by varying the volt-second capacity of the self-saturating saturable reactor.

In other aspects of the invention, I have provided a full wave self-saturating saturable reactor with a pair of inversely connected controlled rectifiers, one of the controlled rectifiers being connected in parallel circuit relationship with one of the saturating elements of the full wave self-saturating saturable reactor. One of the controlled rectifiers is switched on during each alternate half cycle to provide a path for the discharge current of the capacitor that substantially bypasses the full wave self-saturating saturable reactor.

In carrying out another form of the invention, I have provided a voltage stabilizing system wherein each of the saturating elements of the full wave self-saturating saturable reactor are connected at one end thereof to a tap on an autotransformer winding and at the other end to the gate of one of the controlled rectifiers so that the voltage across the gate and cathode of the controlled rectifier does not exceed a predetermined limit. A control winding is inductively coupled on the self-saturating saturable reactor and is supplied with a current that is substantially proportional to deviations in the output voltage from the predetermined stabilized level. A magnetomotive force is thereby applied to the self-saturating saturable reactor to change its volt-second capacity in order to compensate for deviations in the output voltage from the predetermined stabilized level. Further, in another aspect of the invention the portion of the secondary winding supplying a potential to the controlled rectifiers is wound with a conductor wire having a diameter relatively larger in size than the other portion of the secondary winding.

The subject matter which I regard as my invention is set forth in the appended claims. The invention itself, however, together with further objects and advantages thereof, may be better understood by referring to the following description taken in connection with the accompanying drawings in which:

Figure 1:
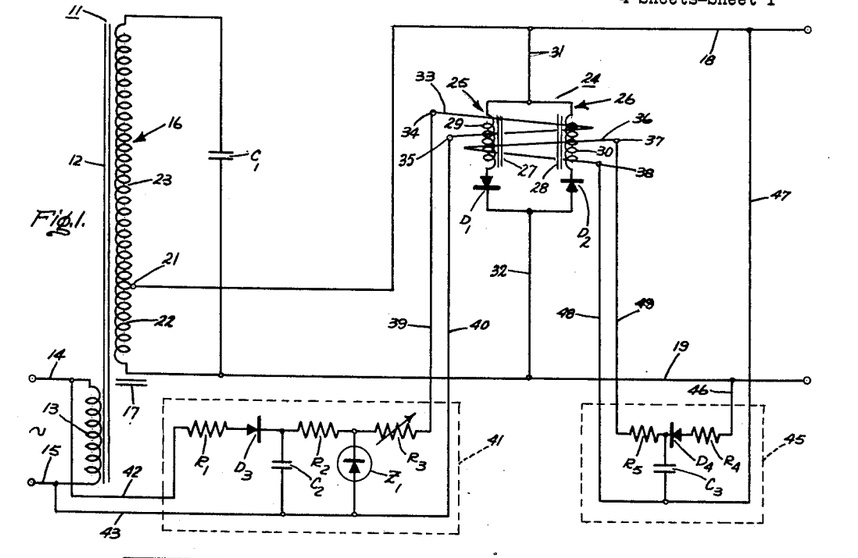
FIG. 1 is a schematic circuit diagram of a voltage stabilizing system in accordance with the invention.

Referring now to FIG. 1, the voltage stabilizing system of the invention includes a high reactance transformer 11 having a magnetic core 12 formed of suitable magnetic material, a primary winding 13 connected across a pair of alternating current input terminal leads 14, 15 and inductively coupled on the magnetic core 12 with a secondary winding 16 which is loosely coupled to primary winding 13. As shown in FIG. 1, the loose coupling is indicated schematically by the magnetic shunts 17 which are interposed between the primary winding 13 and the secondary winding 16 as is well known in the art.

A pair of output leads 18, 19 are provided for connection to a suitable load which is not shown. One output lead 18 is connected to a tap 21 on the secondary winding 16 which divides the secondary winding into a first winding portion 22 and a second winding portion 23. Since the other output lead 19 is connected to the lower end of secondary winding 16, it will be seen that the output terminal leads 18, 19 are connected across the secondary winding portion 22.

In order to provide a storage element for energy supplied at the output terminals 18, 19 and to cause a leading current to flow through the secondary winding 16, a capacitor $C_1$ is connected across the secondary winding 16. It will be noted that the capacitor $C_1$ shunts both winding portions 22, 23. The principal purpose of the secondary winding portion 23 is to increase the voltage across the capacitor $C_1$ above the voltage induced across the secondary winding portion 22 to which the output leads 18, 19 are connected. By increasing this voltage it is possible to reduce the size and cost of the capacitor $C_1$. It will be appreciated that the capacitor $C_1$ provides a suitable value of capacitive reactance in the circuit so that a leading current flows in the secondary winding 16.

In order to maintain a constant output voltage irrespective of changes in the input frequency and irrespective of wide variations in the load, I have provided in the illustrative embodiment of the invention shown in FIG. 1, a full wave, self-saturating saturable reactor 24, the volt-second capacity of which is varied. As the term is used herein, the volt-second capacity of a reactor is the volt-seconds required to change the core from a preset position on its magnetization loop, as determined by the net ampere-turns of the control windings 33 and 36, to positive saturation during one-half cycle of the applied voltage wave.

The self-saturating reactor 24 includes a pair of saturating elements 25, 26, each having a saturable core 27, 28 with a gate winding 29, 30 wound thereon. The gate windings 29, 30 are connected in series with oppositely poled diodes $D_1$, $D_2$. The cores 27, 28 are of magnetic material characterized by a very low coercive force.

It will be understood that the self-saturating saturable reactor 24 displays a high impedance when cores 27, 28 are unsaturated and a low impedance when the cores 27, 28 are saturated. Blocking diodes $D_1$, $D_2$ allow only unidirectional current flow in the gate windings 29, 30 respectively, one of the saturable elements 25, 26 controlling the load current on alternate half cycles. In the illustrative embodiment of the invention shown in FIG. 1, the cores were toroidal in shape. The diodes $D_1$, $D_2$ may be of any suitable type such as selenium, silicon, and germanium half-wave rectifiers. It will be noted that the self-saturating saturable reactor 24 forms a closed loop that is connected across the secondary winding portions 22 and across output leads 18, 19 by conductors 31, 32.

A reference control winding 33 having terminals 34, 35 and a feedback control winding 36 having terminals 37, 38 are both wound about both magnetic cores 27, 28 and apply a net magnetomotive force to control the volt-second capacity of the full wave self-saturating saturable reactor 24. The reference control winding 33 is supplied with a predetermined substantially constant reference current by leads 39, 40 connected to terminals 34, 35 and to reference control circuit identified generally by dashed rectangle 41. As shown in FIG. 1, reference circuit 41 is energized from the power supply to which input terminal leads 14, 15 are connected by virtue of the reference circuit leads 42, 43 which are connected in circuit with input terminal leads 14, 15, respectively. A resistor $R_1$ is connected in circuit with lead 42 and in circuit with diode $D_3$. Resistor $R_1$ serves as a current limiting resistor. Diode $D_3$ functions as a half wave rectifier and permits current to flow into the reference control circuit 41 only when the anode of diode $D_3$ is positive with respect to cathode. As is shown in the drawings, the anode of a rectifier or diode is represented by the arrow symbol and the cathode by the line drawn through the apex of the arrow symbol.

A capacitor $C_2$ is connected across the reference circuit and serves to filter the half wave rectified output of the diode $D_3$ by discharging between pulses when the anode of the diode $D_3$ is negative. A resistor $R_2$ is connected in circuit between the diode $D_3$ and zener diode $Z_1$ and limits the current to the zener diode $Z_1$. The zener diode $Z_1$ is connected in series with resistor $R_2$ across the filter capacitor $C_2$ and serves in conjunction with variable resistor $R_3$ to provide a predetermined reference current to the reference control winding 33. It will be appreciated that the voltage level at which the system is stabilized can be varied by adjusting the variable resistor $R_3$.

The zener diode $Z_1$ used in the illustrative embodiment of the invention is a semiconductor diode, preferably a silicon diode having a predetermined reverse breakdown voltage. At voltages below the breakdown value, the zener diode $Z_1$ acts as a rectifier and only a negligibly small leakage current can flow in the reverse direction. However, when the voltage exceeds the breakdown value, the zener diode $Z_1$ presents a very low dynamic resistance and permits current to flow freely in the reverse direction with no substantial increase in voltage. Thus, it will be seen that the reference control circuit will provide a current reference level that is substantially constant over a wide range of fluctuations in the supply voltage.

In order to correct for deviation in output voltage from a predetermined stabilized level, a feedback control circuit, identified generally by dashed rectangle 45, provides a current to feedback control winding 36 which is directly proportional to the voltage across the output leads 18, 19. The feedback control circuit 45 includes input leads 46, 47 connected across the output leads 18, 19, resistors $R_4$, $R_5$, a diode $D_4$, a capacitor $C_3$ and leads 48, 49 connected in circuit with terminals 37, 38 of feedback control winding 36. The resistors $R_4$, $R_5$ limit the current supplied to diode $D_4$ and to feedback control winding 36, respectively. Diode $D_4$ and the capacitor $C_3$ rectify and filter the current supplied to feedback control winding 36.

Figure 2:
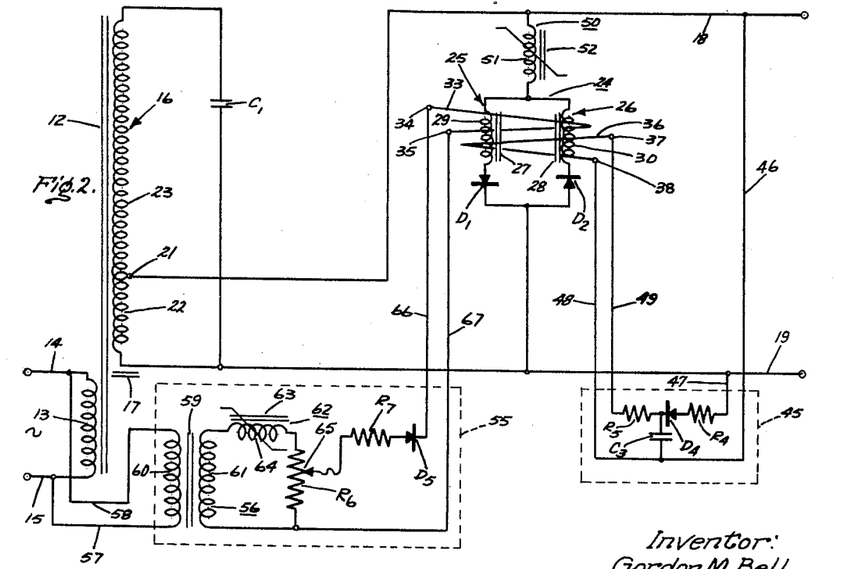
FIG. 2 is a schematic circuit diagram of another embodiment of the invention.

Having reference now to the embodiment of the invention illustrated in FIG. 2, the full wave-self-saturating saturable reactor 24, shown therein, is essentially similar to the one illustrated in FIG. 1. It will be noted that an additional saturable reactor 50 has been included in series circuit relationship with the full wave self-saturating saturable reactor 24. The additional reactor 50 has a single winding 51 and magnetic core 52. Reactor 50 provides a constant volt-second capacity that is almost enough but insufficient to provide the volt-seconds required to produce the output voltage for which the voltage stabilizing system is designed. The self-saturating saturable reactor 24 in this embodiment of the invention need only provide the volt-seconds that are required to handle the entire predetermined range of deviations in the output voltage. Such an arrangement makes it possible to employ smaller components in the self-saturating saturable reactor 24 and in some applications may result in a more economical utilization of material. Further, it will be noted in the voltage stabilizing system shown in FIG. 2, I have illustrated therein another modification of a suitable reference control circuit that may be employed in the practice of the invention.

Continuing with the detailed description of the circuit shown in FIG. 2, corresponding parts of the circuits shown therein and in FIG. 1 are identified by identical reference numerals and letters. A self-saturating saturable reactor 24 includes a pair of saturating elements 25, 26. Each of the saturating elements 25, 26 includes a saturable core 27, 28 having a gate winding 29, 30, respectively. The gate windings 29, 30 are connected in series with oppositely poled diodes $D_1$, $D_2$. A reference control winding 33 having terminals 34, 35 and a feedback control winding 36 having terminals 37, 38 are wound about both magnetic cores 27, 28 of the self-saturating saturable reactor 24.

It will be seen that the high reactance transformer 11 employed in this circuit is substantially similar to the one hereinbefore described in connection with the circuit of FIG. 1. The high reactance transformer 11 includes a primary winding 13 connected across a pair of input leads 14, 15 adapted for connection across a power supply not shown. A secondary winding 16 is divided by a tap 21 into a secondary winding portion 22 and a secondary winding portion 23. The secondary winding 16 is inductively coupled with the primary winding 13 on a magnetic core 12. Magnetic shunts 17 provide a loose coupling between the secondary winding 16 and primary winding 13. A pair of output leads 18, 19 serve as means connecting the circuit to a load not shown. In order to provide a storage element for the energy supplied the output leads 18, 19, a capacitor $C_1$ is connected across the secondary winding 16.

The feedback circuit 45 shown in FIG. 2 is connected across the output leads 18, 19 by conductors 46, 47 and includes a resistor $R_4$, $R_5$, a diode $D_4$, a capacitor $C_3$ and leads 48, 49. Leads 48, 49 connect the feedback circuit 45 to the terminals 37, 38 to provide a direct current to feedback control winding 36 that is directly proportional to the voltage across output leads 18, 19.

In the reference circuit, identified generally by the dashed rectangle 55 shown in FIG. 2, a step-down transformer 56 is connected across the input terminal leads 14, 15 by reference circuit leads 57, 58. The transformer 56 includes a magnetic core 59, a primary winding 60 and secondary winding 61. A square loop reactor 62 having a core 63 and winding 64 is connected in series circuit with secondary winding 61. A rheostat $R_6$ having an adjustable tap 65 is connected across the secondary winding 61 and reactor 62. Thus, in the reference circuit 55 shown in FIG. 2, reactor 62 is the element that provides a stable reference current. The core material used for reactor 62 has a square loop magnetization curve. The peak value of the current through winding 64 does not vary appreciably with changes in the frequency or voltage supplied across leads 57, 58 until the core starts to saturate. By providing winding 64 with a sufficient number of turns so as to avoid saturation, it is possible to provide a substantially constant current to rheostat $R_6$. Rheostat $R_6$ permits adjustments to be made in the reference current level so that the system can be operated at various voltage levels. Resistor $R_7$ limits the current supplied to diode $D_5$ and leads 66, 67 connect reference circuit 55 across terminals 34, 35.

Figure 3:
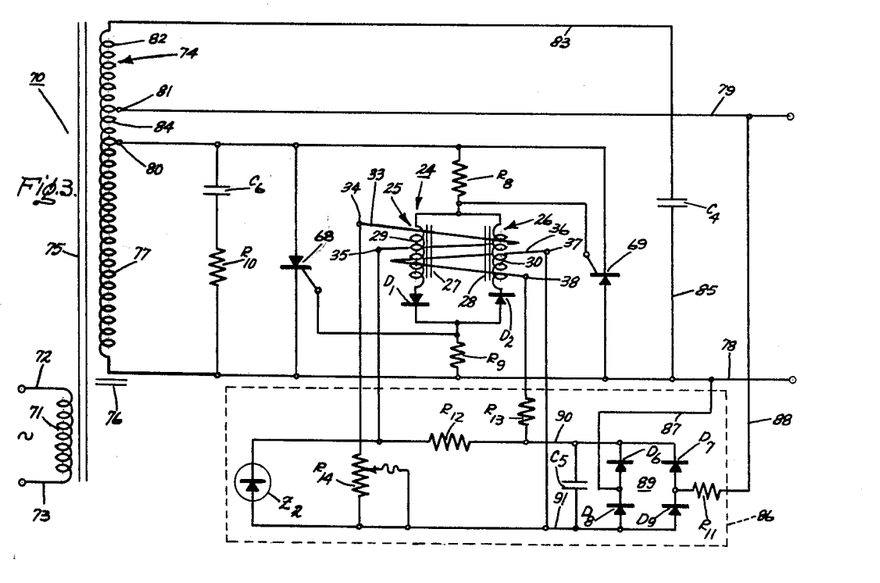
FIG. 3 is a schematic circuit diagram of an embodiment of the invention employing controlled rectifiers.

Referring now to FIG. 3, in the exemplification of the invention shown therein a self-saturating saturable reactor 24 functions to fire a pair of inversely connected controlled rectifiers 68, 69. Similarly, as in the other illustrative embodiments of the invention, the voltage stabilizing system of FIG. 3 employs a high reactance transformer 70 having a primary winding 71 connected across input terminal leads 72, 73, a secondary winding 74, a capacitor $C_4$ connected across secondary winding 74, a magnetic core 75 and magnetic shunts 76. It will be noted that secondary winding 74 includes a first secondary winding portion 77 between one output lead 78 and a tap 80. A second output lead 79 is connected to a tap 81 on secondary winding 74.

Secondary winding portion 82 between tap 81 and the lead 83 connecting the end of the secondary winding 74 to the upper plate of capacitor $C_4$, as shown in FIG. 3, serves the purpose of increasing the voltage across capacitor $C_4$ above the voltage across the output leads 78, 79 so that it is possible to reduce the size and cost of capacitor $C_4$.

It was found that where controlled rectifiers 68, 69 were employed in conjunction with a self-saturating saturable reactor 24 and a high reactance transformer 70 that secondary winding portion 77 which supplies power to controlled rectifiers 68, 69 must have a lower resistance than secondary winding portions 82, 84. Further, it was found that the discharge current in secondary winding portion 77 was approximately ten times greater than the discharge current in the circuit comprising leads 83, 85, capacitor $C_4$ and the entire secondary winding 74 of transformer 70. When the entire winding of the secondary 74 was of the same size, this resulted in a reduction in the efficiency of the output of the voltage stabilizing system and caused the secondary portion 77 supplying the controlled rectifiers 68, 69 to overheat. Thus, in order to improve the efficiency, the secondary winding portion 77 was wound with a wire that is substantially larger in diameter and that provided a resistance approximately $\frac{1}{10}$ of the resistance of the winding that would be used if a conventional voltage stabilizer had been employed.

The components of the full wave self-saturating saturable reactor 24 shown in FIG. 3 are identified by the same reference numerals as used in FIGS. 1 and 2. The full wave self-saturating saturable reactor 24 includes saturating elements 24, 25, each having a core 27, 28 formed of suitable sharply saturating low coercive force magnetic material, a gate winding 28, 29 and diode $D_1$, $D_2$, respectively. Reference control winding 33 having terminals 34, 35 and feedback control winding 36 having terminals 37, 38 are continuously wound around both cores 27, 28. Resistors $R_8$, $R_9$ are provided to by-pass the magnetizing current of the saturable reactor 24 in either direction during its unsaturated state and allow controlled rectifiers 68, 69 to be fired only when saturation occurs. A serially connected resistor $R_{10}$ and capacitor $C_6$ are connected across controlled rectifiers 68, 69 to dissipate any stored inductive energy in the secondary winding portion 77.

It will be seen that one of the functions of the self-saturating saturable reactor 24, like the other reactors in the other exemplifications of the invention shown in FIGS. 1 and 2, is to provide a predetermined variable volt-second capacity as determined by the net magnetomotive forced applied by reference and feedback controlled windings 33, 36. However, the self-saturating saturable reactor shown in FIG. 3 does not carry the entire discharge current from the capacitor $C_4$ but fires in each half cycle one of the controlled rectifiers 68, 69 which provides a by-pass path for the capacitor discharge current.

Controlled rectifiers 68, 69 used in this exemplification of the invention, as well as in the other exemplifications thereof, were silicon semiconductors, each having three terminals, the anodes being represented by the arrow symbol, the cathode being represented by the line drawn through the apex of the arrow symbol and the gate by the diagonal line extending from the cathode. Silicon controlled rectifiers are suitable switching elements since they are asymmetrical conductors which can be readily switched on during each forward half cycle of the alternating current supply. The operating characteristics of a silicon controlled rectifier are such that it will not conduct in the forward direction until a gate signal is applied, then it will conduct with a forward characteristic very similar to that of an ordinary rectifier. Thereafter, it continues conduction even after the signal is removed, provided that a minimum current flows through the rectifier.

In the circuit illustrated in FIG. 3, the transient current flow resulting from the discharge of the capacitor $C_4$ during each half cycle is handled by one of the controlled rectifiers 68, 69 and substantially by-passes self-saturating saturable reactor 24. Since the saturating elements 25, 26 and diodes $D_1$, $D_2$ do not have to handle the discharge current, relatively less expensive components can be employed. Further, using controlled rectifiers 68, 69 to divert the capacitor discharge current results in reduction of copper and iron losses which occur whenever magnetic cores 27, 28 are driven far into saturation.

Continuing with the detailed description of the circuit shown in FIG. 3, the reference and feedback circuit 86 is generally identified by the dashed rectangle 86. It will be seen that both reference and the feedback control windings 33, 36 are energized from the output of the voltage stabilizing system by virtue of the leads 87, 88 connected across output leads 78, 79. Such an arrangement provides the advantage that zener diode $Z_2$ receives its power from an output that is relatively stable.

The input leads 87, 88 are connected across a bridge rectifier 89 having diodes $D_6$, $D_7$, $D_8$, $D_9$. The full wave rectified output of the bridge rectifier 89 is filtered by a capacitor $C_5$ connected across the bridge output leads 90, 91. Resistors $R_{12}$ and $R_{13}$ are current limiting resistors and limit the current supplied respectively to zener diode $Z_2$ and to the feedback control winding 36. A variable resistor $R_{14}$ is connected in series with the reference winding 33 so that the reference current may be changed to permit the output of the voltage stabilizing system to be readily stabilized at various predetermined levels as desired. Reference control winding 33 and feedback control winding 36 are continuously wound about both cores 27, 28 of the self-saturating saturable reactor 24 so that the net magnetomotive force produced by these windings determines the volt-second capacity of self-saturating saturable reactor 24 and thereby controls the voltage at the output leads 78, 79.

Figure 4:
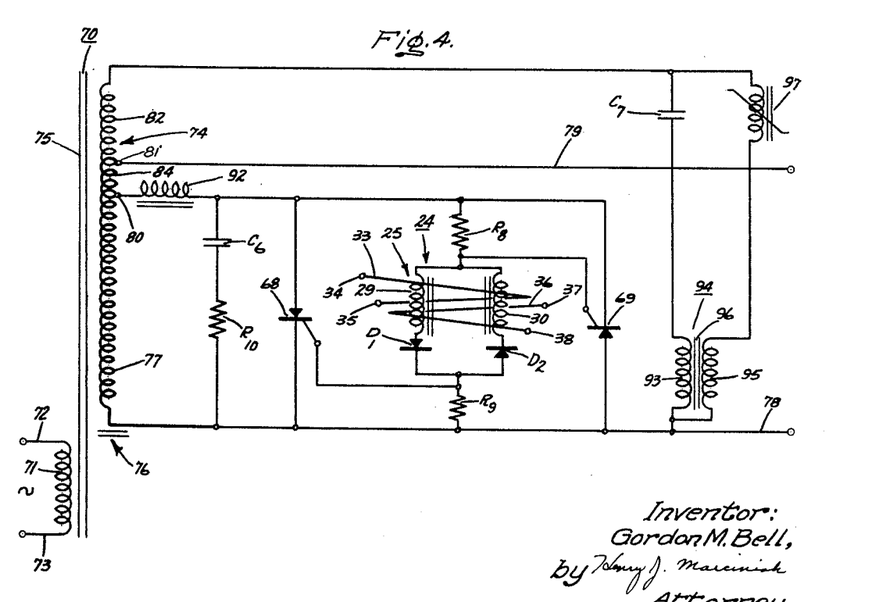
FIG. 4 shows a modification of the embodiment illustrated in FIG. 3 wherein the reference and feedback circuit are omitted.

In FIG. 4, I have illustrated another embodiment of the invention in which reference and feedback control circuits have been omitted. It will be understood that the reference and feedback circuits such as are shown in FIG. 3, or other suitable circuit means may be employed to supply a direct current to the feedback control winding that is directly proportional to the output voltage and a reference current to reference control winding 33 that is substantially constant.

The circuit shown in FIG. 4 employs essentially the same type of high reactance transformer 70 as shown in FIG. 3. High reactance transformer 70 includes a primary winding 71 connected across a pair of input leads 72, 73, a secondary winding 74, a magnetic core 75 and magnetic shunts 76 interposed between the primary winding 71 and secondary winding 74. Secondary winding 74 is divided by tap 80 into a first winding portion 77 which has a wire size larger in cross section than winding portions 82, 84. A pair of output terminal leads 78, 79 are provided for connection to a load not shown. Output lead 78 is brought out from one end of the secondary winding 74 and the other output lead 79 from a tap 81 on the secondary winding 74.

The self-saturating saturable reactor 24 illustrated in FIG. 4 is essentially the same as the reactor shown in FIG. 3. Accordingly, corresponding parts thereof are identified by using the same reference numerals and letters. The self-saturating saturable reactor 24 includes saturating elements 25, 26, each having a core 27, 28, a gate winding 29, 30 and a diode $D_1$, $D_2$, respectively. Reference control winding 33 is continuously wound on both cores 27, 28 and is provided with terminals 34, 35 for connection to a suitable reference circuit. Feedback control winding 36 is also continuously wound about both cores 27, 28 and is provided with terminals 37, 38 for connection to a suitable feedback circuit. Resistors $R_8$, $R_9$ shunt the gate terminals of controlled rectifiers 68, 69.

In the circuit shown in FIG. 4, it will be noted that an inductor 92 is connected to the tap 80 of secondary winding 74. It was found that inductor 92 had a smoothing effect on the output voltage wave form. A capacitor $C_6$ and resistor $R_{10}$ are serially connected across the controlled rectifiers 68, 69 in order to suppress undesirable voltage spikes resulting from inductive energy stored in the secondary winding portion and in the inductor 92. Capacitor $C_7$ is serially connected with a first winding 93 of a linear reactor transformer 94 having a second winding 95 and a magnetic core 96. A nonlinear reactor 97 is connected in series with the second winding 95 across capacitor $C_7$ and the first winding 93. This arrangement of a transformer and a nonlinear reactor to filter harmonics is described in and claimed in U.S. Patent No. 2,825,024 granted to R. R. Berghoff and assigned to the same assignee as the present invention. This patent discloses a preferred means for filtering undesired harmonics in the output voltage of the voltage stabilizing system of this invention. It will also be apparent to those skilled in the art that other means can be utilized in conjunction with the voltage stabilizing system of the present invention to filter out objectionable harmonics present in the output voltage. As an example, the odd harmonics can also be filtered out by providing a plurality of tuned filter circuits connected across the output, each filter circuit comprising a capacitor and a reactor being respectively tuned to the odd harmonics which are to be filtered out of the output voltage.

Figure 5:
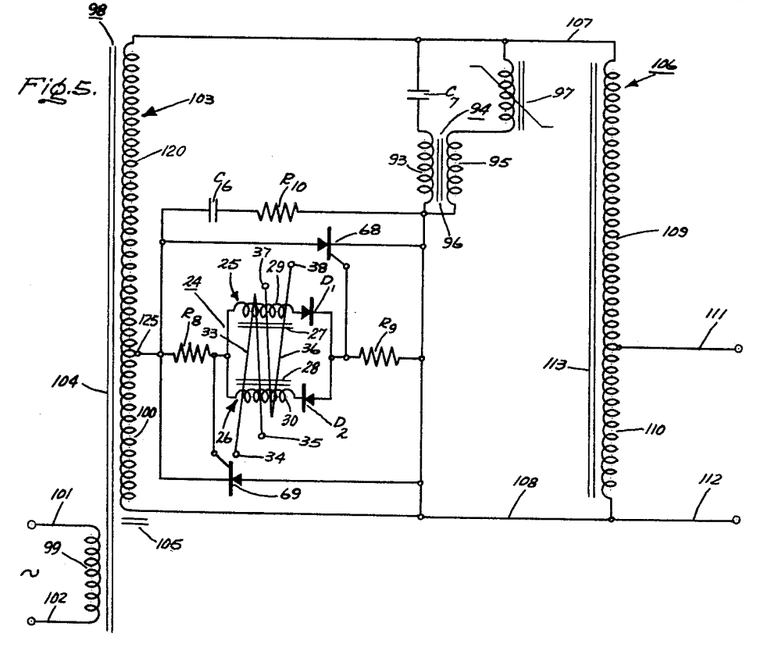
FIG. 5 illustrates another exemplification of the invention.

In FIG. 5, I have illustrated therein an improved circuit arrangement wherein it is possible by the use of an autotransformer 106 to provide an output voltage that can be readily varied by locating the output lead 11 at a preselected tap on the autotransformer winding 109. It will be noted that in the interest of clarity I have again eliminated the reference and feedback control circuit and parts which correspond to similar parts in the other illustrative embodiments are identified by the same reference numerals and letters. In this exemplification of the invention, the reference and feedback control circuit shown in the FIG. 3 was employed and maintained the output voltage at a constant level within plus or minus .6 percent for an input voltage variation of plus or minus 15 percent, an input frequency variation of plus or minus five percent and an output load variation from no load to full load.

Continuing with the detailed description of the circuit shown in FIG. 5, it will be seen that a high reactance transformer 98 having a primary winding 99 connected across a pair of input terminal leads 101, 102, a secondary winding 103 having winding portions 100, 120 and a tap 125 thereon, a magnetic core 104 and magnetic shunts 105 to provide loose coupling between the primary winding 99 and secondary winding 103. An autotransformer 106 is connected across the secondary winding 103 to step-down the voltage across leads 107, 108. The autotransformer 106 includes an autotransformer winding 109, secondary portion 110 connected across output leads 111, 112 and a magnetic core 113.

The self-saturating saturable reactor 24 includes a pair of saturating elements 25, 26, each having a magnetic core 27, 28, gate winding 29, 30 and a diode $D_1$, $D_2$, respectively. The volt-second capacity of the self-saturating saturable reactor 24 is controlled by reference control winding 33 and a feedback control winding 36. Reference control winding 33 has a pair of terminals 34, 35 for connection to a reference circuit such as shown in FIG. 3. Similarly, the feedback winding 36 is provided with a pair of terminals 37, 38 for connection to a feedback circuit such as shown in FIG. 3. Resistors $R_8$, $R_9$ are provided to shunt the gate and cathode terminals of controlled rectifiers 68, 69, respectively. Capacitor $C_6$ and a resistor $R_{10}$ are serially connected across controlled rectifiers 68, 69 to suppress voltage peaks resulting from energy stored in inductive elements in the circuit.

It will be noted that the voltage stabilizing system shown in FIG. 5 employs a means for filtering harmonics from the output voltage. This means is similar to the one utilized in the system shown in FIG. 4 and includes a saturable reactor 97 and a transformer 94 having a first winding 93 and second winding 95 inductively coupled on a magnetic core 96.

By way of more specific exemplification of the invention, the voltage stabilizing system shown in FIG. 5 was constructed having the following circuit components which are given by way of illustration:

Transformer 98:
    Primary winding 99 __________ 70 turns of .0763 inch wire.
    Secondary winding portion 100.    31 turns of .0605 inch wire.
    Secondary winding portion 120.    260 turns of .0605 inch wire.

Transformer 94:
    First winding 93 ____________ 182 turns of .0605 inch wire.
    Second winding 95 __________ 400 turns of .0226 inch wire.

Autotransformer 106 ____________ 500 volt amperes, 600 volt/115 volts, 60 cycles per second.
Saturable reactor 97 _____________ 1025 turns of .0201 inch wire.
Capacitor $C_7$ _________________ 15 microfarads, 660 v. A.C.
Resistor $R_{10}$ _________________ 27 ohms.
Capacitor $C_6$ _________________ 25 microfarads.
Controlled rectifiers 68, 69 _______ General Electric C-36, Silicon Controlled Rectifiers.
Resistors $R_8$, $R_9$ ______________ 50 ohms.
Diodes $D_1$, $D_2$ _______________ General Electric IN 440.
Reference control winding 33 _____ 1000 turns of .004 inch wire.
Feedback control winding 36 _____ 1000 turns of .004 inch wire.
Saturable reactor cores 27, 28 ____ Arnold Engineering Co. 2T5233-52.
Gate windings 29, 30 ____________ 7500 turns of .004 inch wire.

In the foregoing exemplification of the invention, the reference and feedback circuit 86 illustrated in FIG. 3 was employed. By way of illustration, the circuit components used in the reference and feedback circuit are described as follows:

Diodes $D_6$, $D_7$, $D_8$, $D_9$ ___________ General Electric IN 538.
Capacitor $C_5$ __________________ 105 microfarads.
Resistor $R_{13}$ _________________ 3000 ohms.
Resistor $R_{12}$ _________________ 1000 ohms.
Variable resistor $R_{14}$ __________ 0–200 ohms.
Zener diode $Z_2$ ________________ General Electric IN 430.

The voltage stabilizing system utilizing the foregoing components was operated and tested. It was rated for a maximum output power of .5 kva. The voltage regulation was plus or minus .13 percent from zero to full load and approximately .22 percent for an input voltage variation of plus or minus 15 percent and for an input frequency variation of plus or minus 5 percent.

Figure 7:
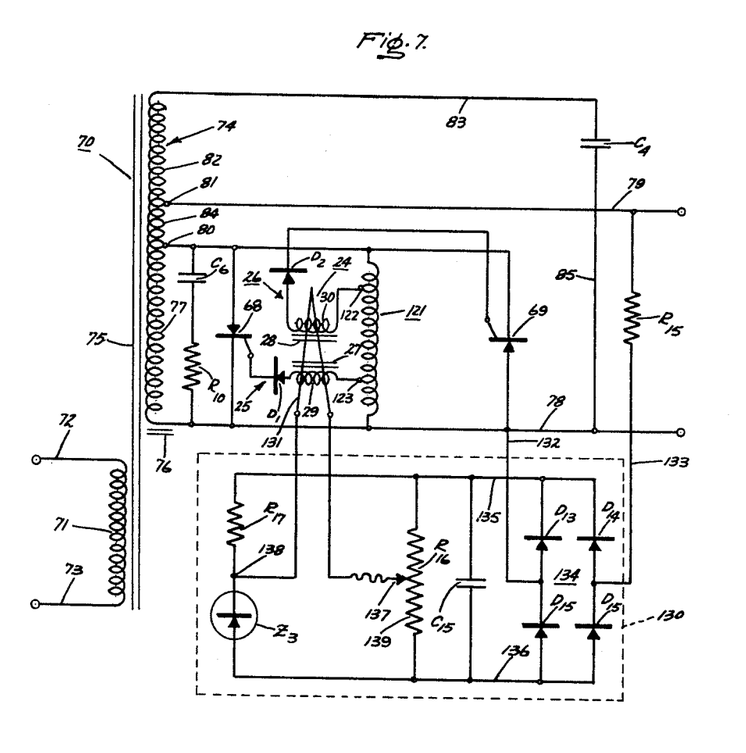
FIG. 7 is a schematic circuit diagram of one of the preferred embodiments of the invention wherein the saturating elements of the self-saturating saturable reactor are connected to taps on an autotransformer winding and a control circuit is employed to supply current to a control winding which is directly proportional to the deviations in the output voltage from the predetermined stabilized level.

Referring now to FIG. 7, I have illustrated a control circuit 130 wherein only one control winding 131 is inductively coupled on the self-saturating saturable reactor 24. The control circuit 130 supplies a current to the control winding 131 that is directly proportional to deviations in the output voltage of the stabilizing system from a predetermined stabilized voltage level. Another important modification of the invention is shown wherein the saturating elements 25, 26 of the self-saturating saturable reactor 24 are connected to preselected taps on an autotransformer winding 121. The advantages of these circuit modifications will be hereinafter more fully discussed.

Continuing with the description of the voltage stabilizing system shown in FIG. 7, it will be noted that the voltage stabilizing transformer 70 employs components and circuit connections substantially similar to those shown in the circuit of FIG. 3. Therefore, we have identified the corresponding parts thereof by using the same reference numerals and letters. The self-saturating saturable reactor 24 is comprised of saturating elements 25, 26, each of which has a core 27, 28, a gate winding 29, 30 and a diode $D_1$, $D_2$, respectively. The voltage stabilizing transformer 70 includes a primary winding 71 connected across a pair of input terminal leads 72, 73, a secondary winding 74, a magnetic core 75 and magnetic shunts 76. Taps 80 and 81 divide the secondary winding into the secondary winding portion 77, 84, 82, respectively. A pair of output terminal leads 78, 79 are provided for connection to a load (not shown). Conductors 83, 85 connect capacitor $C_4$ in circuit with the output lead 78 and with one end of the secondary winding 74.

As shown in FIG. 7, the saturating element 25 is connected at one end to the gate of controlled rectifier 68 and at the other end to a first tap 123 on autotransformer winding 121. The other self-saturating element 26 is connected at one end to control rectifier 69 and at its other end to a second tap 122 of autotransformer winding 121. In the specific exemplification of this circuit which will hereinafter be more fully described, the first and second taps 123 and 122 were brought out at a point on autotransformer 121 so that the voltage between the gate and cathode of the controlled rectifiers 68, 69 was approximately 10 volts. It was found that by connecting the saturating elements 25, 26 in this manner that the peak positive voltage between the gate and cathode of the controlled rectifiers 68, 69 could be effectively maintained at 10 volts or less. It will be appreciated that one of the limitations imposed on the gate signal of a silicon controlled rectifier is that the peak positive voltage between the gate and the cathode should not exceed 10 volts. A serially connected resistor $R_{10}$ and capacitor $C_6$ are connected in circuit across controlled rectifier 68, 69 to dissipate any stored inductive energy in the secondary winding portion 77.

Referring now more specifically to the control circuit 130, this circuit, as shown in FIG. 7, furnishes direct current to a control winding 131 inductively coupled to the self-saturating saturable reactor 24. In this modification of the invention, one control winding 131 is employed and the current supplied to the winding 131 is proportional to the deviation of the output voltage from the predetermined stabilized level. This arrangement provides a very important advantage in that the magnitude of current flowing in the control winding 131 of the self-saturating saturable reactor 24 is considerably less than would be the case if the control and reference circuit 86 of FIG. 3 were employed reducing the amount of current in the control winding. It was found that such an arrangement significantly reduced the sensitivity of voltage stabilizing system to ambient temperature changes. Thus, the embodiment of the invention shown in FIG. 7 is preferably adaptable to applications which require that the voltage stabilizing system be relatively insensitive to temperature changes.

The control circuit 130 in FIG. 7 is energized from the output of the voltage stabilizing system and is connected thereacross by the leads 132, 133. A resistor $R_{15}$ is connected in circuit with lead 133 to limit the current to control circuit 130. The leads 132, 133 are connected across a bridge rectifier 134 having diodes $D_{13}$, $D_{14}$, $D_{15}$, and $D_{16}$. A capacitor $C_{15}$ is connected across bridge output leads 135, 136 in order to filter the rectified output of the bridge rectifier 134. A potentiometer $R_{16}$ is connected across output leads 135, 136. An adjustable arm 137 is provided on the potentiometer $R_{16}$ in order that adjustments may be made in the voltage at which the system is stabilized. It will be noted that the control winding 131 is connected to the adjustable arm 137 and to junction 138. A resistor $R_{17}$ is connected in circuit with output lead 135 and junction 138 in order to limit the current to the zener diode $Z_3$. Thus, in this arrangement during operation the zener diode $Z_3$ maintains the voltage across control winding 131 and the portion 139 of the potentiometer $R_{16}$ at a predetermined voltage level the breakdown level of zener diode $Z_3$. As the voltage across the potentiometer $R_{16}$ is increased, the voltage drop across control winding 131 is proportionally decreased. Therefore, the current flow through winding 131 is also decreased in an amount which is substantially proportional to the deviation in the output voltage from the predetermined stabilized level. Consequently, the magnetomotive force applied by winding 131 in the magnetic circuit of the self-saturating saturable reactor 24 changes in that volt-second capacity of reactor 24 is varied to compensate for the deviation in the output voltage. It will be seen, therefore, that the operation of the voltage stabilizing transformer 70 is substantially similar to the circuit shown in FIG. 3 as will be hereinafter more fully described.

Further, by way of a more specific exemplification of the invention, the voltage stabilizing system as shown in FIG. 7 was constructed with the following circuit components:

| Component | Value |
|---|---|
| Primary winding 71 | 70 turns of .763 inch wire. |
| Secondary winding 74 | 291 turns of .605 inch wire. |
| Capacitor $C_6$ | 125 microfarads. |
| Resistor $R_{10}$ | 27 ohms. |
| Controlled rectifiers 68, 69 | General Electric C36 Silicon Controlled Rectifiers. |
| Diodes $D_1$, $D_2$ | General Electric IN 440. |
| Autotransformer winding 121 | 612 turns of .0179 inch wire (taps 122 and 123 brought out to provide ten volts). |
| Saturable reactor windings 29, 30 | 1050 turns of .008 inch wire. |
| Saturable cores | Toroidal core manufactured by Magnetics Incorporated, Catalog No. 50026-4D. |
| Capacitor $C_4$ | 15 microfarads, 660 volts, A. C. |
| Resistor $R_{15}$ | 1500 ohms. |
| Diodes $D_{13}$, $D_{14}$, $D_{15}$, $D_{16}$ | General Electric IN 538. |
| Capacitor $C_{15}$ | 10 microfarads, 50 volts, D. C. |
| Potentiometer $R_{16}$ | 0–6000 ohms. |
| Control winding 131 | 4000 turns of .0113 wire. |
| Resistor $R_{17}$ | 6000 ohms. |
| Zener diode $Z_3$ | General Electric IN 430 (breakdown voltage of 8.8 volts). |

The foregoing voltage stabilizing system was rated for a maximum output power of .5 kva. The voltage regulation obtained was plus or minus .05 percent from zero to full load and plus or minus .025 percent for an input variation of plus or minus 15 percent and for an input frequency variation of plus or minus 5 percent. The system was operated and tested with the harmonic filtering arrangement shown in FIG. 4. Further, when the system was operated at a temperature of 20 degrees centigrade above room temperature, the deviation from the stabilized level was observed to be approximately 0.5 volt.

From the foregoing, it will be apparent that I have provided a voltage stabilizing system having significantly improved voltage regulation characteristics and that is not appreciably affected in its operation by temperature changes. Further, the autotransformer arrangement positively limits the voltage across the gate and cathode of the controlled rectifiers and thereby protects the rectifiers against destruction resulting from excessive voltage being applied across the gate and cathode.

In general, the output voltage in the systems of the present invention is maintained at a predetermined stabilized level by varying the volt-second capacity of the self-saturating saturable reactor 24 which supplies the variation in volt-seconds required to compensate for deviations of the output voltage from the stabilized level. Self-saturating saturable reactor 24 in conjunction with the secondary winding of the high reactance transformer provides the volt-second capacity necessary in the circuit to maintain the voltage output at the predetermined level.

It will be appreciated that the secondary winding of a high reactance transformer having a capacitor connected across the secondary winding or a portion thereof becomes in effect a nonlinear reactor since the capacitor causes a leading current to flow in the secondary and also causes the core of the transformer to operate in the saturated region. In a conventional voltage stabilizing system such a system compensates for variations in the input voltage only and does not compensate for deviations in the output voltage due to changes in the load or supply frequency. Further, the system stabilizes the voltage at one predetermined level since the volt-second capacity of the secondary winding is fixed. In accordance with the present invention I have provided an improved voltage stabilizing system wherein during operation the system compensates for deviations in the output voltage by automatically varying its volt-second capacity.

Having more specific reference now to the operation of the voltage stabilizing system shown in FIG. 1, let us assume that the input leads 14, 15 are connected across an alternating current supply such as a 115, 60 cycle commercial supply. An increased sinusoidal voltage is induced across the secondary winding 16. During the half cycle when the upper plate of capacitor $C_1$ is negative and the lower plate positive, it will be seen that the anode represented by the arrow symbol of diode $D_2$ will be more positive with respect to the cathode. Therefore, diode $D_2$ will pass current through the gate winding 30 of saturating element 26. When core 28 is unsaturated, winding 30 displays a maximum impedance to current flow. However, when the volt-time integral of the voltage applied to winding 30 reaches a value such that the core 28 becomes saturated, the current flowing through gate winding 30 will increase sharply, thereby causing the capacitor $C_1$ to discharge and to reverse its polarity. Thus, the volt-time integral determines the voltage across capacitor $C_1$ and across the output terminals of the voltage stabilizing system. This volt-time integral may be conveniently expressed in terms of volt-seconds which the reactor can absorb as the flux swings from the preset flux density on the magnetization loop to the saturation flux density and may be expressed as follows:

$$\text{Volt-seconds} = NA(B_s - B_1) \times 10^{-8}$$

$N$ = number of reactor turns,
$A$ = effective core cross sectional area, square centimeters, and
$B_s$ = saturation flux density, gauss,
$B_1$ = preset flux density, gauss.

During the half cycle that diode $D_2$ conducts, the other core 27 is in a resetting half cycle and the net magnetomotive force provided by the reference and feedback control windings 33, 36 causes the flux density of this core to retrace its dynamic hysteresis loop from the point reached during the previous gating half cycle to the point now established by the net magnetomotive force of the reference and feedback control winding 33, 36.

In the next half cycle diode $D_2$ reverts to a blocking state due to the polarity reversal, core 28 enters it resetting half cycle, and the gating half cycle of saturating element 25 occurs. The core 27 of saturating element 25 absorbs the volt-seconds to which it has been reset in the previous half cycle. When the volt-seconds have been absorbed, the core 27 reaches saturation thereby causing the capacitor $C_1$ to discharge and reverse its polarity. The volt-second capacity of self-saturating saturable reactor 24 is controlled by the magnitude of the net magnetomotive force or net ampere-turns provided by the reference and control windings 33, 36.

To further illustrate the stabilizing action of the system illustrated in FIG. 1, let us assume that the frequency of the supply voltage is increased. Since the output voltage is a function of the input frequency, the output voltage will momentarily increase, and this increase in voltage will produce a proportional increase in the current in feedback control winding 36. Since the reference circuit provides a fixed reference current as determined by the setting of the variable resistor $R_3$, the resultant magnetomotive force applied to the saturating elements 25, 26 by reference and feedback control windings 33, 36 will be of such magnitude as to decrease the volt-second capacity thereof. Thus, in the voltage stabilizing system of the invention the deviation in the output voltage momentarily produced by a change in input frequency is corrected by the change in the volt-second capacity of the saturating elements 25, 26 so that the voltage output is maintained at a predetermined level. Different output voltage levels can be obtained by supplying a different reference current to reference control winding 33. Consequently, the system will stabilize with reference to a different voltage level. In the circuit shown in FIG. 1, it was found that for a gain of 20 volts per ampere turn in the self-saturating saturable reactor 24 and by using control winding current to provide approximately 500 times the control ampere turns necessary to saturate the saturable reactor 24, it was possible to stabilize output voltage within plus or minus one-half of one percent.

Referring now to the voltage stabilizing system shown in FIG. 2, it will be seen that this circuit operates in substantially the same manner as the circuit shown in FIG. 1. The self-saturating saturable reactor 24 provides only the volt-seconds that are required to handle a predetermined range of variations in the output voltage.

In the circuits shown in FIGS. 1 and 2, the self-saturating saturable reactor 24 must handle the discharge current of the capacitor $C_1$. Where it is desirable to employ smaller saturable reactors, the circuits shown in FIGS. 3, 4 and 5 may be preferably employed. It will be seen that the circuits shown in FIGS. 3, 4 and 5 have a substantially similar mode of operation. When saturating element 25 has absorbed its rated volt-seconds, it saturates and its impedance suddenly decreases causing a sudden increase in current flow through its gate winding 29. The increased current flow which occurs at the saturation point is utilized to fire controlled rectifier 68. When fired, conducting controlled rectifier 68 presents less impedance than saturating element 25 and consequently the discharge current from capacitor 24 by-passes self-saturating saturable reactor 24.

More specifically, referring now to the circuit shown in FIG. 3, let us assume that during an arbitrarily selected half cycle of operation that the upper plate of capacitor $C_4$ is of such polarity that it is negative. At this instant, the cathode of diode $D_2$ will be negative with respect to the anode, diode $D_2$ will allow current to pass, and saturating element 26 will enter its gating cycle.

When reactor 26 has absorbed its volt-second capacity as determined by the net magnetomotive force applied by the reference and feedback windings 29, 30, the core 28 saturates. The current flowing through resistor $R_8$, gate winding 30 and resistor $R_9$ will start to increase rapidly producing a voltage drop across resistor $R_8$ sufficient to fire controlled rectifier 69.

When controlled rectifier 69 is fired, any further increase of the current flowing through the saturable reactor 24 is cut off, since the conducting controlled rectifier 69 presents a low impedance path. Thus, the instantaneous current flow follows a path consisting of lead 76, winding 77 and the lead from tap 80 to controlled rectifier 69. By autotransformer action between winding portion 77 and combined winding portions 82, 84 provided by core 75, a low impedance path is provided for capacitor $C_4$ through lead 83, winding portions 82, 84 and winding 77 causing capacitor $C_4$ to discharge. Because of the leakage reactance between windings 77 and 74, the capacitor $C_4$ is caused to charge in the reverse direction to nearly the same voltage magnitude as it was previously. By autotransformer action, the voltage that appears on capacitor $C_4$ appears across output leads 78 and 79 only at a lower useful value.

At the end of the half cycle, the polarity of the capacitor $C_4$ has reversed, and the cathode of diode $D_1$ becomes negative with respect to the anode. Therefore, diode $D_1$ now conducts, and saturating element 25 absorbs volts-seconds. When it absorbs its rated volt-seconds, it saturates. At the point of saturation, its impedance decreases and the current through $R_9$ increases sharply thereby providing a voltage across resistor $R_9$ that fires controlled rectifier 68. When controlled rectifier 68 is fired, current flow through the self-saturating saturable reactor 24 ceases and it provides a low impedance path so that by autotransformer action the capacitor $C_4$ discharges through the secondary winding portions 82, 84 and 77 to output lead 78. At the end of the cycle the polarity of capacitor $C_4$ again reverses and the cycle of operation continues to repeat itself.

Reference and feedback circuits 86 shown in FIG. 3 are supplied current from the output leads 78, 79. The current supplied is rectified by bridge rectifier 89 and filtered by a capacitor $C_5$ connected across the direct current output terminals 90, 91. It will be seen that the current supplied to feedback control winding 36 is a direct current proportional to the voltage at the output leads 78, 79. The direct current supplied to the reference control winding 33 is a constant current which is set at a predetermined value by adjusting the variable resistor $R_{14}$ and is maintained at this level by the zener diode $Z_2$. Thus, as the output voltage across the output leads 78, 79 deviates from a predetermined stabilized level, the reference and feedback circuit 86 automatically applies a net magnetomotive force of the proper magnitude to change the volt-second capacity of the full wave self-saturating saturable reactor 24 and corrects for the voltage deviation.

A principal advantage of the system is that deviations in the output voltage resulting from such causes, as for example, changes in the load or changes in the supply frequency, are compensated. It will be appreciated that voltage stabilizers of the prior art employing a high reactance transformer with a capacitor connected in parallel across the secondary winding or a part thereof compensate only for variations occurring in the supply voltage.

Figure 6:
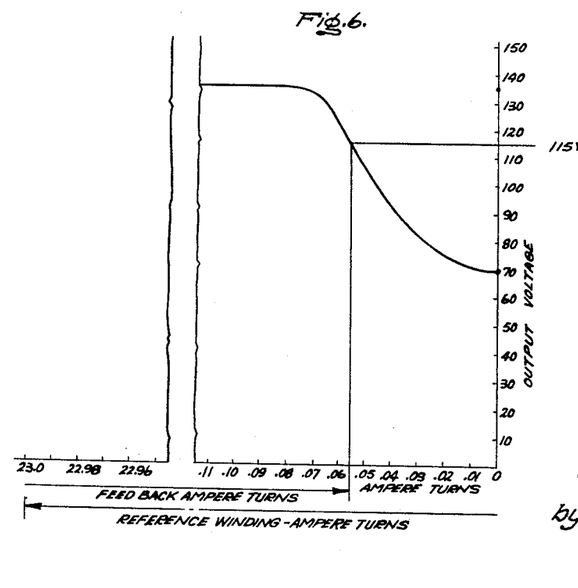
FIG. 6 illustrates a plot of the output voltage versus ampere turns on the self-saturating saturable reactor for the voltage stabilizing system shown in FIG. 4 employing the reference and feedback circuit of the system illustrated in FIG. 3.

In FIG. 6, I have shown the characteristic curve for the voltage stabilizing system illustrated schematically in FIG. 5 wherein the reference and feedback circuit 86 shown in FIG. 3 was employed. The curve represents a plot of the output voltage versus the ampere turns of the full wave self-saturating saturable reactor 24. The resistor $R_{14}$ of the reference circuit was set to stabilize the output voltage at a 115 volt level as indicated on the horizontal line at the 115 volt point on the ordinate of the curve shown in FIG. 6. The reference circuit provided a 23 ampere turn reference level as indicated by the arrow below the abscissa. At this setting of the variable resistor $R_{14}$, the feedback circuit provided 22.944 ampere turns resulting in a net ampere turns of approximately .056 which provided 115 volts at the output leads 111, 112. Deviations above and below the 115 volt level will produce corresponding proportional compensating variations in the ampere turn level of the feedback control winding. As the ampere turns of the feedback windings are varied, the volt-second capacity of the self-saturating saturable reactor 24 is changed to correct for the voltage deviation.

The circuit of FIG. 5 was operated from an alternating current supply of 115 volts, 60 cycles and the voltage across the entire secondary winding 103 was 550 volts. The tap 125 was brought out from the secondary winding 103 to provide a 60 volt supply to the controlled rectifiers 68, 69. The voltage across the autotransformer 106 was 550 volts. This voltage was stepped down by locating the tap at a point to provide an output between 110 and 120 volts. Thus, it will be apparent that this circuit arrangement provides the advantage that the output voltage of the system can be readily varied by locating the tap on the autotransformer winding 109 that will provide the desired output voltage.

Turning now to the circuit shown in FIG. 7, let us assume that the primary winding 71 is energized from a suitable alternating current supply and that during an arbitrarily selected half cycle of operation that the upper plate of capacitor $C_4$ is of such polarity that it is negative. Similarly, as in the circuit shown in FIG. 3, the cathode of diode $D_2$ will be negative with respect to its anode and diode $D_2$ will allow current to pass. At this instant saturating element 26 will enter its gating cycle and when it has absorbed its voltage-second capacity as determined by the magnetomotive force applied by the control winding 131, the core 28 saturates. When core 28 saturates, the impedance in the winding 30 sharply decreases and a current pulse is supplied at the gate of control rectifier 69.

Any further increase in the current through saturable reactor 24 is cut off since the conducting controlled rectifier 69 presents a low impedance path consisting of lead 78, winding 77 and the lead from tap 80 to controlled rectifier 69. Because of the autotransformer action between winding portion 77 and the combined winding portions 82 and 84, a low impedance path is provided for capacitor $C_4$ through lead 83, winding portions 82, 84 and winding 77 causing capacitor $C_4$ to discharge therethrough. Due to the leakage reactance in the secondary winding 74, capacitor $C_4$ is charged in a reverse direction to nearly the same magnitude of voltage as it was previously charged. The voltage across capacitor $C_4$ appears at the output leads at a lower predetermined value because of the autotransformer action between winding portion 82 and winding portions 84 and 77.

In the next half cycle, due to the polarity reversal of capacitor $C_4$ the cathode of diode $D_1$ has become negative with respect to its anode and is now in a conducting state. Thus, saturating element 25 absorbs volt-seconds. When saturating element 25 reaches its point of saturation, its impedance decreases sharply and a current pulse is provided at the gate of controlled rectifier 68 to fiire the controlled rectifier 68. In this half cycle, when controlled rectifier 68 is in a conducting state, it provides a low impedance path so that by autotransformer action capaictor $C_4$ discharges through secondary winding portions 82, 84, 77 and to output lead 78. At the end of the cycle, the polarity across capacitor $C_4$ again reverses and the cycle of operation repeats itself.

As shown in FIG. 7, the control circuit 130 is supplied an alternating current from output leads 78, 79. This alternating current is rectified by bridge rectifier 134 and filtered by capacitor $C_{15}$ connected across direct current output leads 135, 136 of the bridge rectifier 134. Thus, a D.C. voltage which is directly proportional to the voltage at output leads 78, 79 is applied across potentiometer $R_{16}$. Zener diode $Z_3$ maintains the voltage across control winding 131 and the portion 139 of the potentiometer $R_{15}$ at a predetermined voltage level, the breakdown level of zener diode $Z_3$. When the voltage across output leads 78, 79 increases from the predetermined stabilized level, the voltage across potentiometer $R_{16}$ is proportionately increased. Since zener diode $Z_3$ tends to maintain the total voltage across control winding 131 and the portion 139 of the potentiometer $R_{16}$ at a constant level, the voltage drop across control winding 131 is proportionally decreased. Thus, the current flow through control winding 131 is correspondingly decreased in an amount proportional to the deviation in the output voltage from the predetermined stabilized level. Consequently, the magnetomotive force applied by the winding 131 in the magnetic circuit of self-saturating saturable reactor 24 changes and the volt-second capacity of reactor 24 is varied to compensate for this voltage deviation.

A principal advantage of this arrangement is that the control winding 131 handles a current of a relatively small magnitude and therefore the circuit is less susceptible to the influence of ambient temperature changes. If a reference and a control winding are used as shown in FIG. 3, the magnitude of the current flow in these windings is substantially proportional in magnitude to the arrows drawn along the abscissa of the curve shown in FIG. 6. In the control circuit 130 shown in FIG. 7, the current flow through the control winding 131 is proportional to the difference in the lengths of the two arrows.

It will be appreciated that the various specific circuits described herein are intended as illustrative examples of the invention and that the invention is not limited to such examples. Further, it will be apparent that many other modifications of the particular embodiments of the invention described herein may be made. It is to be understood, therefore, that I intend by the appended claims to cover all such modifications that fall within the true spirit and scope of the invention.

What I claim as new and desire to secure by Letters Patent of the United States:

1. A voltage stabilizing system for maintaining a voltage at a predetermined stabilized level comprising a high reactance transformer including a magnetic core with a primary winding and a secondary winding thereon; a pair of input terminal leads for connection to a source of alternating current voltage; said primary winding being connected across said alternating current input leads; an output circuit including a pair of output leads connected across at least a portion of said secondary winding; a capacitor connected across said secondary winding; a self-saturating saturable reactor connected across at least a portion of said secondary winding and having a reference control winding and a feedback control winding inductively coupled on said self-saturating saturable reactor; a first reference circuit means providing a substantially constant current to said reference control winding; and a feedback circuit means connected in circuit with said output terminals and providing a current to said feedback control winding substantially proportional to the voltage at said output leads; said reference control winding and said feedback control winding providing a net magnetomotive force for resetting said core and for varying the volt-second capacity of said self-saturating saturable reactor in response to deviations in the output voltage from said predetermined stabilized voltage level so as to maintain the output voltage across the output terminals substantially constant at said predetermined level.

2. A voltage stabilizing system for providing an alternating current voltage at a predetermined stabilized level comprising: a high reactance transformer including a magnetic core with a primary and a secondary winding inductively coupled thereon; a pair of input leads for connection across an alternating current source; said primary winding being connected across said input terminals; an output circuit including a pair of output leads connected in circuit with at least a portion of said secondary winding; a capacitor connected across at least a portion of said secondary winding to cause a leading current to flow therein and to serve as a storage element for energy supplied to said output circuit; a full wave self-saturating saturable reactor connected across at least a portion of said secondary winding and having a reference control winding and a feedback control winding inductively coupled thereon; a reference circuit means connected in circuit with said output leads to provide said reference control winding with a substantially constant reference current; a feedback circuit means connected in circuit with said output leads to provide a current to said feedback control winding substantially proportional to said voltage at said output terminals; said reference control windings and said feedback winding providing a resultant magnetomotive force in said self-saturating saturable reactor to vary the volt-second capacity thereof in response to changes in the output voltage in order to maintain said output voltage at said predetermined stabilized level.

3. The voltage stabilizing system as set forth in claim 2 wherein said reference circuit means includes a variable resistor to selectively vary the reference current supplied to said full wave self-saturating saturable reactor thereby providing a means for varying the stabilized level of the voltage at said output leads.

4. A voltage stabilizing system for providing an output voltage at a predetermined stabilized level comprising: a high reactance transformer including a magnetic core with a primary and secondary winding inductively coupled thereon; a pair of alternating current input leads; said primary winding being connected across said alternating current input leads; an output circuit including a pair of output leads connected across at least a portion of said secondary winding; a full wave self-saturating saturable reactor comprising a first saturating element having a saturable core with a gate winding thereon serially connected with a diode and a second saturating element having a saturable core and a gate winding thereon serially connected with a diode; said diodes being oppositely poled and said serially connected gate windings and diodes being connected in parallel across at least a portion of said secondary winding; a capacitor connected across at least a portion of said secondary winding to cause a leading current to flow therethrough; a reference control winding inductively coupled on said saturable cores of said first and second saturating elements; a feedback control winding inductively coupled on the saturable cores of said first and second saturating elements; reference circuit means for providing a substantially constant reference current to said reference control winding; and a feedback circuit means connected in circuit with said output circuit for providing a current to said feedback control winding substantially proportional to the voltage across said output terminals, said reference winding and said control winding providing a resultant magnetomotive force in said self-saturating saturable reactor to vary the volt-second capacity thereof in response to deviations of the output voltage from said predetermined stabilized level thereby compensating for such deviations so as to maintain the output voltage substantially constant at said predetermined level.

5. A voltage stabilizing system for maintaining an output votage at a predetermined stabilized level comprising: a high reactance transformer including a magnetic core with a primary and a secondary winding inductively coupled thereon; a pair of input terminal leads for connection across an alternating current source; said primary winding being connected across said input terminal leads, a capacitor connected across at least a portion of said secondary winding for causing a leading current to flow therethrough; an output circuit including a pair of output leads connected in circuit with at least a portion of said secondary winding; a full wave self-saturating saturable reactor connected across at least a portion of said secondary winding and having a reference control winding and a feedback control winding inductively coupled thereon; a bridge rectifier connected across said output leads; a current filtering means connected in circuit with said bridge rectifier to provide a filtered direct current output to a pair of output terminal leads; a first circuit means connecting said feedback control winding in circuit with said direct current output terminal leads; a second circuit means connecting said resistor and zener diode in circuit across said direct current output terminals; said reference control winding and said variable resistor connected across said zener diode so as to maintain the current supplied to said reference control winding at a substantially constant predetermined level; said reference control winding and said feedback control winding providing a resultant magnetomotive force in said self-saturating saturable reactor to vary the volt-second capacity thereof in response to deviations in the voltage across the output terminals in order to compensate for said deviations in the output voltage and maintain the voltage at the output terminals substantially constant at said predetermined stabilized level.

6. A voltage stabilizing system for maintaining an output voltage at a predetermined stabilized level comprising: a high reactance transformer including a magnetic core having a primary winding and a secondary winding inductively coupled thereon; a pair of input terminal leads for connection across an alternating current source; said primary winding being connected across said input terminal leads; an output circuit including a pair of output leads connected across at least a portion of said secondary winding; a capacitor connected across at least a portion of said secondary winding to cause a leading current to flow therethrough; a full wave self-saturating saturable reactor connected across at least a portion of said secondary winding and having a reference control winding and a feedback control winding inductively coupled thereon; a reference circuit means including a reference circuit transformer having a magnetic core, a primary winding and a secondary winding inductively coupled thereon, a pair of supply leads connected across said primary winding of said reference circuit transformer with said input terminal leads of said high reactance transformer; said reference circuit means including saturable reactor, a rheostat having an adjustable arm, said rheostat and said saturable reactor being connected in series circuit relationship across said reference circuit transformer, a rectifying means connected in circuit with said reference control winding and in circuit with said adjustable arm and one end of said rheostat; said reference circuit providing a substantially constant reference current to said reference control winding; feedback control means connected in circuit with said output leads to provide current to said feedback control winding substantially proportional to the voltage at said output leads; said reference control winding and said feedback control winding providing a magnetomotive force to vary the volt-second capacity of said full wave self-saturating saturable reactor in response to deviations in the output voltage thereby compensating for said voltage deviations and maintaining said output voltage at said predetermined stabilized level.

7. A voltage stabilizing system for maintaining the output voltage at a predetermined stabilized level comprising: a high reactance transformer including a magnetic core having a primary winding and a secondary winding having a tap thereon and inductively coupled with said primary winding; a pair of input terminal leads for connection across an alternating current supply; said primary winding being connected across said input terminal leads; an output circuit including a pair of output leads, one of said output leads being connected in circuit with said tap and the other in circuit with one end of said secondary winding; a capacitor connected across said secondary winding to provide a leading current therethrough; a self-saturating saturable reactor having a reference control winding and a feedback control winding inductively coupled thereon; said self-saturating saturable reactor being connected across said output leads; a reference circuit means for providing a substantially constant reference current to said reference control windings; a feedback control means for suppling said feedback control winding with a current substantially proportional to the output voltage; said reference control winding and feedback control winding providing a net magnetomotive force to vary the volt-second capacity of said self-saturating saturable reactor in response to deviations in the output voltage from said predetermined stabilized level and thereby compensate for said deviations.

8. A voltage stabilizing system for maintaining an output voltage at a predetermined stabilized level comprising: a high reactance transformer including a magnetic core having a primary winding and a secondary winding inductively coupled thereon; a pair of input terminal leads for connection across an alternating current supply; said primary winding being connected across said input terminal leads; an output circuit including a pair of output leads and connected in circuit with at least a portion of the secondary winding; a capacitor connected across said secondary winding; a full wave self-saturating saturable reactor connected across a first secondary portion of said secondary winding; a pair of controlled rectifiers, each of said controlled rectifiers having a cathode, anode and gate electrode; circuit means connecting said controlled rectifiers in inverse parallel circuit relationship with each other and across said first winding portion of said secondary winding and connecting said gate electrodes in circuit with said saturable reactor so that one of said controlled rectifiers are alternately fired during each half cycle when said self-saturating saturable reactor reaches a saturation level in each half cycle; said conducting controlled rectifier providing a path for the discharge current from said capacitor thereby substantially by-passing said self-saturating saturable reactor; said self-saturating saturable reactor having a reference control winding and a feedback winding inductively coupled thereon; a reference circuit means for providing a substantially constant reference current to said reference control winding; a feedback control circuit means for providing a current to said feedback control winding substantially proportional to the voltage at said output leads; said feedback control winding and said reference control winding applying a net magnetomotive force to vary the volt-second capacity of said self-saturating saturable reactor in response to deviations of the output voltage and thereby compensate for said deviations and maintain said output voltage constant at said predetermined stabilized level.

9. A voltage stabilizing system for maintaining an output voltage at a constant predetermined stabilized level comprising: a high reactance transformer including a magnetic core having a primary winding and a secondary winding inductively coupled thereon; a pair of input terminal leads for connection across an alternating current supply; said primary winding being connected across said input terminal leads; an output circuit including a pair of output leads and connected in circuit with at least a portion of the secondary winding; a capacitor connected across said secondary winding; a self-saturating saturable reactor comprising a first and a second saturating element each having a saturable core and a gate winding serially connected to a diode, said diodes being oppositely poled and said first and second saturating elements being connected in parallel circuit relationship with respect to each other and across a first winding portion of said secondary winding; a first controlled rectifier connected in parallel circuit relationship with said first saturating element and across said first winding portion; a second controlled rectifier oppositely poled from said first controlled rectifier and connected in parallel circuit relationship with said second saturating element and across said first winding portion; each of said controlled rectifiers having an anode, cathode and gate electrode, said gate electrode of said first controlled rectifier being connected in circuit with said first saturating element so that said first controlled rectifier is fired during the half cycle when said first saturating element reaches its saturation level; said gate electrode of said second controlled rectifier being connected in circuit with said second saturating element so that said second controlled rectifier is fired in the alternating half cycle when said second saturating element reaches its saturation level; a reference control winding and a feedback control winding inductively coupled with both said first and second saturating elements; reference circuit means for providing a substantially predetermined constant current level to said reference control winding; a feedback circuit means for providing a direct current substantially proportional to the voltage at said output leads; said reference winding and said feedback windings providing a net magnetomotive force to vary the volt-second capacity of said self-saturating saturable reactor in response to deviations in the output voltage in order to compensate for said deviations and maintain said output voltage at said predetermined stabilized level.

10. A voltage stabilizing system for maintaining an output voltage at a predetermined stabilized level comprising: a high reactance transformer including a magnetic core having a primary winding and a secondary winding inductively coupled thereon; a pair of input terminal leads for connection across an alternating current supply; said primary winding being connected across said input terminal leads; a pair of output leads connected across at least a portion of the secondary winding; a capacitor connected across said secondary winding; a full wave self-saturating saturable reactor connected across at least a portion of said secondary winding; a first controlled rectifier having an anode, cathode and gate electrode connected in parallel circuit relationship across said self-saturating saturable reactor; a second controlled rectifier oppositely poled from said first controlled rectifier and connected in parallel circuit relationship across said self-saturating saturable reactor; circuit means connecting said gate electrodes in circuit with said full wave self-saturating saturable reactor so that said first controlled rectifier is fired during the half-cycle when said self-saturating saturable reactor saturates and said second controlled rectifier is fired in the other half cycle when said self-saturating saturable reactor saturates in the other half cycle, said oppositely poled controlled rectifiers providing a path for the discharge current of said capacitor substantially bypassing said self-saturating saturable reactor during each half cycle; said full wave self-saturating saturable reactor having a reference control winding and a feedback winding inductively coupled thereon; a reference circuit means including a zener diode for supplying a substantially constant reference current to said reference control winding; a feedback circuit means including a feedback circuit means for providing a direct current to said feedback control winding substantially proportional to the voltage across said output lead; a rectifying means connected across said output leads for supplying direct current to said reference circuit means and said feedback circuit means; said reference control winding and said feedback control windings providing a net magnetomotive force to vary the volt-second capacity of said self-saturating saturable reactor in response to deviations in the output voltage and to compensate for said deviations thereby maintaining the output voltage substantially constant at said predetermined stabilized level.

11. A voltage stabilizing system for maintaining an output voltage at a predetermined stabilized level comprising: a high reactance transformer including a magnetic core having a primary winding and a secondary winding inductively coupled thereon; a pair of input terminal leads for connection across an alternating current supply; said primary winding being connected across said input terminals; said secondary winding having a first winding portion and a second winding portion, said first winding portion being wound with a conductor wire having a relatively greater cross section than said second winding portion; a pair of output leads, said output leads being connected across said first secondary winding portion and at least a part of said secondary winding portion; a capacitor connected across said secondary winding; a self-saturating saturable reactor connected in circuit across said first winding portion, a first controlled rectifier connected in parallel circuit relationship across said full wave self-saturating saturable reactor; a second controlled rectifier oppositely poled from said first controlled rectifier and connected in parallel circuit relationship across said self-saturating saturable reactor; circuit means connecting said controlled rectifiers in circuit with said self-saturating saturable reactor so that said first and second controlled rectifiers are alternately fired when said self-saturating saturable reactor reaches its saturation level in each half cycle; said self-saturating saturable reactor having a reference control winding and a feedback control winding inductively coupled thereon; reference circuit means for supplying a substantially constant reference current to said reference control winding; and a feedback control circuit means for supplying a current to said feedback control winding substantially proportional to the voltage across said output leads, said reference control winding and said feedback winding applying a net magnetomotive force to said self-saturating saturable reactor to vary the volt-second capacity thereof in response to deviations in the output voltage and maintain the output voltage at said predetermined stabilized level.

12. A voltage stabilizing system for maintaining an output voltage at a predetermined stabilized level comprising: a high reactance transformer including a magnetic core having a primary winding and a secondary winding inductively coupled thereon; a pair of input terminal leads for connection across an alternating current supply; said primary winding being connected across said input terminal leads and said secondary winding having a first winding portion and a second winding portion, said first winding portion having a wire size substantially larger in diameter than said second winding portion; a pair of output leads, said first winding portion and at least a part of said second winding portion being connected across said output leads; a capacitor connected across said secondary winding to cause a leading current to flow therein; a full wave self-saturating saturable reactor comprising a first saturating element and a second saturating element, said first saturating element including a serially connected gate winding and a first diode and said second saturating element including a serially connected gate winding and a second diode oppositely poled from said first diode, a first controlled rectifier connected in parallel circuit relationship across said first saturating element; a second controlled rectifier connected in inverse parallel relationship across said second saturating element; circuit means connecting said first and second controlled rectifiers in circuit with said first and second saturating element so that said first controlled rectifier is fired during each positive half cycle as said first saturating element saturates and said second controlled rectifier is fired during each negative half cycle when said second saturating element saturates, said conducting controlled rectifier providing a path whereby the discharge current from the capacitor during each half cycle substantially by-passes said self-saturating saturable reactor; a reference control winding and a feedback control winding inductively coupled with said first and second saturating elements; a reference circuit means for providing a substantially constant direct current to said reference control winding; feedback circuit means for supplying a direct current to said feedback control winding substantially proportional to the output voltage; said reference control winding and said feedback control winding applying a net magnetomotive force to said self-saturating saturable reactor to vary the volt-second capacity thereof in response to deviations in the output voltage from the predetermined stabilized level and thereby compensate for said deviations.

13. A voltage stabilizing system for maintaining a voltage at a predetermined stabilized level comprising: a high reactance transformer including a magnetic core with a primary winding and a secondary winding thereon; a pair of input terminals for connection to a source of alternating current voltage; said primary winding being connected across said alternating current input leads; an output circuit including a pair of output leads connected across at least a portion of said secondary winding; a capacitor connected across said secondary winding; a self-saturating saturable reactor connected in circuit with at least a portion of said secondary winding; semiconductor switching means connected in parallel circuit relation with said portion of the secondary winding, said semiconductor switching means providing a low impedance path for the discharge of said capacitor in response to the condition of saturation of said self-saturating saturable reactor; and means for providing a magnetomotive force for resetting and for varying the volt-second capacity of said self-saturating saturable reactor in response to deviations in the output voltage from said predetermined stabilized voltage level so as to maintain the output voltage across said output leads substantially constant at said predetermined level.

14. A voltage stabilizing system for maintaining an output voltage at a constant predetermined stabilized level comprising: a high reactance transformer including a magnetic core having a primary winding and a secondary winding inductively coupled thereon; a pair of input terminal leads for connection across said alternating current supply; said primary winding being connected across said input terminal leads; an output circuit including a pair of output leads and connected in circuit with at least a portion of the secondary winding; a capacitor connected across said secondary winding; a self-saturating saturable reactor comprising a first and a second saturating element, each having a saturable core and a gate winding serially connected to a diode; a pair of controlled rectifiers each having a gate and connected in inverse parallel relation across at least a portion of said secondary winding; an autotransformer winding having a first and a second tap and connected in circuit across said controlled rectifiers, one of said saturating elements being connected in circuit with the gate of one of said controlled rectifiers and said first tap and the other of said saturating elements being connected in circuit with the gate of the other of the said controlled rectifiers and said second tap; and means for applying a magnetomotive force in the magnetic circuit of said self-saturating saturable reactor for resetting said reactor and for varying the volt-second capacity of said self-saturating saturable reactor in response to deviations in the output voltage from said predetermined stabilized voltage level so as to maintain the output voltage across said output terminal substantially constant at said predetermined level.

15. A voltage stabilizing system for maintaining an output voltage at a constant predetermined stabilized level comprising: a high reactance transformer including a magnetic core having a primary winding and a loosely coupled secondary winding inductively coupled thereon; a pair of input terminal leads for connection across an alternating current supply; said primary winding being connected across said input terminal leads; an output circuit including a pair of output leads and connected in circuit with at least a portion of the secondary winding; a capacitor connected across said secondary winding; a self-saturating saturable reactor connected in circuit with at least a portion of said secondary winding, said self-saturating saturable reactor and said secondary winding providing the volt-second capacity required for stabilizing the voltage output and means for applying a magneto-motive force in the magnetic circuit of said saturable reactor to vary said volt-second capacity and thereby cause the voltage charge across said capacitor in each half cycle to be varied in response to deviations in the output voltage from said stabilized voltage level in order to maintain the output voltage across the output terminals substantially constant at said predetermined level.

16. A voltage stabilizing system set forth in claim 15 wherein said means for applying a magnetomotive force in the magnetic circuit of said self-saturating saturable reactor comprises: an alternating current rectifying means including a pair of direct current output leads in circuit with said rectifying means; a potentiometer connected across said direct current output leads, said potentiometer having an adjustable arm; a control winding inductively coupled with said self-saturating saturable reactor; a zener diode, said zener diode and said control winding being connected in circuit with said adjustable arm across a portion of said potentiometer.

17. A voltage stabilizing system for maintaining an output voltage at a constant predetermined stabilized level comprising: a high reactance transformer including a magnetic core having a primary winding and a secondary winding inductively coupled thereon; a pair of input terminal leads for connection across an alternating current supply; said primary winding being connected across said input terminal leads; a capacitor connected across said secondary winding; said secondary winding having a first tap and a second tap; a pair of output leads, one of said output leads being connected to said first tap and the other of said output leads being connected to one end of said secondary winding; a pair of controlled rectifiers connected in inverse parallel relationship in circuit with one of said output leads and said first tap; an autotransformer winding connected in circuit with one of said output leads and said first tap; a self-saturating saturable reactor comprising a first and a second saturating element, each having a saturable core and a gate winding serially connected to a diode; said autotransformer winding having a first and a second tap, said first saturating element being connected in circuit with said first tap and with the gate of one of said controlled rectifiers and said second saturating element being connected in circuit with said second tap and the gate of the other of said controlled rectifiers; and means for supplying a magnetomotive force in the magnetic circuit of said self-saturating saturable reactor to vary the volt-second capacity thereof in response to deviations of the voltage across the output terminals from the predetermined stabilized level, thereby maintaining the voltage output substantially constant at said predetermined level.

References Cited in the file of this patent

UNITED STATES PATENTS

| | | |
|---|---|---|
| 2,709,779 | Bixby | May 31, 1955 |
| 2,960,647 | Kellogg | Nov. 15, 1960 |
| 2,964,694 | Adams | Dec. 13, 1960 |
| 3,092,768 | Kusko | June 4, 1963 |